United States Patent [19]

Miyazawa et al.

[11] Patent Number: 4,780,242

[45] Date of Patent: Oct. 25, 1988

[54] HALOGEN-CONTAINING, OPTICALLY ACTIVE LIQUID CRYSTAL COMPOUND AND LIQUID CRYSTAL COMPOSITION CONTAINING SAME

[75] Inventors: Kazutoshi Miyazawa; Hiromichi Inoue; Shinichi Saito; Takashi Inukai; Kanetsugu Terashima; Mitsuyoshi Inchihashi, all of Yokohamashi, Japan

[73] Assignee: Chisso Corporation, Osaka, Japan

[21] Appl. No.: 838,561

[22] Filed: Mar. 11, 1986

[30] Foreign Application Priority Data

Mar. 14, 1985 [JP] Japan .................................. 60-51512

[51] Int. Cl.$^4$ ...................... C09K 19/20; C09K 19/12; C09K 19/52; C07C 69/76
[52] U.S. Cl. ........................... 252/299.65; 252/299.67; 252/299.01; 350/350 S; 560/59; 560/65; 560/66; 560/73; 560/102; 560/108; 560/109
[58] Field of Search ...................... 252/299.65, 299.67; 350/350 S; 560/59, 60, 61, 62, 65, 73, 66, 102, 108, 109

[56] References Cited

U.S. PATENT DOCUMENTS

| Re. 31,715 | 10/1984 | Coates et al. | 252/299.65 |
|---|---|---|---|
| 4,235,736 | 11/1980 | Beguin et al. | 252/299.65 |
| 4,542,230 | 9/1985 | Gray et al. | 252/299.67 |
| 4,576,732 | 3/1986 | Isogai et al. | 252/299.65 |
| 4,596,667 | 6/1986 | Inukai et al. | 252/299.65 |
| 4,613,209 | 9/1986 | Goodby et al. | 350/350 S |
| 4,622,165 | 11/1986 | Kano et al. | 252/299.65 |
| 4,647,398 | 3/1987 | Saito et al. | 252/299.65 |
| 4,689,176 | 8/1987 | Inoue et al. | 252/299.65 |

FOREIGN PATENT DOCUMENTS

| 153826 | 9/1985 | European Pat. Off. | 252/299.65 |
|---|---|---|---|
| 188222 | 7/1986 | European Pat. Off. | 252/299.65 |
| 191600 | 8/1986 | European Pat. Off. | 252/299.65 |
| 49/55579 | 5/1974 | Japan | 252/299.67 |
| 55/29545 | 3/1980 | Japan | 252/299.65 |
| 55/47642 | 4/1980 | Japan | 252/299.65 |
| 56/65845 | 6/1981 | Japan | 252/299.65 |
| 60/193947 | 10/1985 | Japan | 252/299.65 |
| 61/30559 | 2/1986 | Japan | 252/299.65 |
| 61/30558 | 2/1986 | Japan | 252/299.65 |
| 61/122250 | 6/1986 | Japan | 252/299.65 |
| 61/174294 | 8/1986 | Japan | 252/299.65 |
| 61/257948 | 11/1986 | Japan | 252/299.65 |
| 2061311 | 5/1981 | United Kingdom | 252/299.67 |

OTHER PUBLICATIONS

Gray et al., Liquid Crystals & Plastic Crystals, vol. 1, pp. 142-143, (1974).
Li et al., CA 94:191853d, (1981).
Demus et al., Flussige Kristalle in Tabellon II, pp. 133-136, (1984).
Gray et al., Mol. Cryst. Liq. Cryst., 67, pp. 1-24, (1981).

Primary Examiner—Teddy S. Gron
Assistant Examiner—J. E. Thomas
Attorney, Agent, or Firm—Wenderoth, Lind & Ponack

[57] ABSTRACT

A novel optically active liquid crystal compound and a liquid crystal composition containing the same are provided, which compound is expressed by the formula

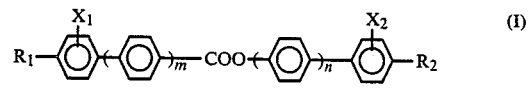

wherein $R_1$ is alkyl or alkoxy of 4-18 C; $R_2$ is alkyl, alkoxy, acyl or alkoxymethyl of 4-18 C; but either one of $R_1$ or $R_2$ is an optically active group; either one of $X_1$ or $X_2$ is halogen atom and the other is H; m and n each are 0 or 1 and m+n is 0 or 1.

3 Claims, No Drawings

HALOGEN-CONTAINING, OPTICALLY ACTIVE LIQUID CRYSTAL COMPOUND AND LIQUID CRYSTAL COMPOSITION CONTAINING SAME

BACKGROUND OF THE INVENTION

1. Field of the Invention

This invention relates to a novel liquid crystal substance and a liquid crystal composition containing the same, and more particularly it relates to a chiral liquid crystal substance having an optically active group and a chiral liquid crystal composition containing the same.

2. Description of the Prior Art

As to liquid crystal display elements, TN type display mode has now been most widely employed, but TN type display elements are inferior in response speed to emissive display elements (such as electroluminescence, plasma display, etc.); hence various improvements therein have been attempted and nevertheless it does not appear that a large extent of improvement has been obtained. Thus, various liquid crystal display devices based on a different principle, in place of TN type display elements have been attempted, and among them there is a display mode utilizing a ferroelectric liquid crystal (N. A. Clerk et al, Applied Phys. lett., 36, 899 (1980)). This mode utilizes the chiral smectic C phase (hereinafter abbreviated to $S_C^*$ phase) or the chiral smectic H phase (hereinafter abbreviated to $S_H^*$ phase), and it is preferred that such phases be present in the vicinity of room temperature.

Certain compounds used for such applications have already been known. The present inventors, too have filed patent applications directed thereto. For example, EP-110299 discloses a compound expressed by the formula

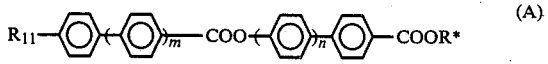

wherein $R_{11}$ represents an alkyl group or an alkoxy group; $R^*$ represents an optically active group; and m and n each represent 0 or 1.

EP-115693 discloses a compound expressed by the formula

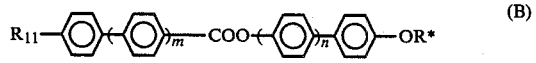

wherein $R_{11}$, $R^*$, m and n are as defined above.

EP-168414 discloses a compound expressed by the formula

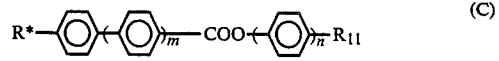

wherein $R^*$, $R_{11}$, m and n are nearly as defined above.

The present inventors have further made research on a liquid crystal substance suitable for utilizing the chiral smectic phase of these ferroelectric liquid crystals, and as a result have found that the above compounds of formulas (A), (B) or (C) but whose benzene ring is substituted by a halogen atom, particularly a fluorine atom as a lateral substituent have superior characteristics to those of formulas (A), (B) or (C).

SUMMARY OF THE INVENTION

The present invention resides in an optically active liquid crystal compound expressed by the formula

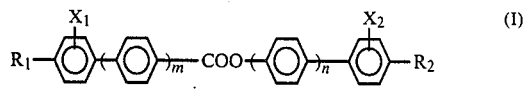

wherein $R_1$ represents an alkyl group or an alkoxy group each of 4 to 18 carbon atoms; $R_2$ represents an alkyl group, an alkoxy group, an acyl group or an alkoxycarbonyl group each of 4 to 18 carbon atoms; but either one of $R_1$ or $R_2$ is an optically active group; either one of $X_1$ or $X_2$ represents a halogen atom and the other represents hydrogen atom; m and n each represent 0 or 1 and m+n is 0 or 1, and a liquid crystal composition containing the same.

DESCRIPTION OF PREFERRED EMBODIMENTS

The above compounds of the formula (I) have as embodiments, compounds expressed by the following seven formulas $(I_a) \sim (I_g)$:

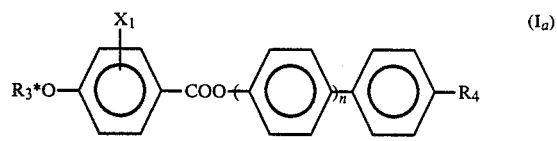

wherein $R_3^*$ represents an optically active alkyl group of 4 to 18 carbon atoms; $R_4$ represents an alkyl group, an alkoxy group, an acyl group or an alkoxycarbonyl group each of 4 to 18 carbon atoms; $X_1$ represents a halogen atom; and n represents 0 or 1.

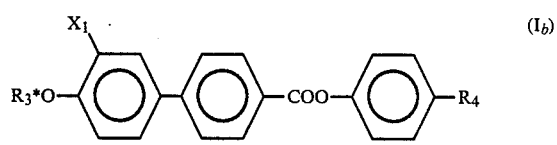

wherein $R_3^*$, $R_4$ and $X_1$ are as defined above.

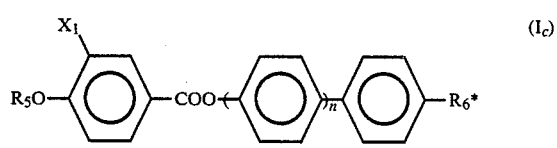

wherein $R_5$ represents an alkyl group of 4 to 18 carbon atoms; $R_6^*$ represents an optically active alkyl, alkoxy, acyl or alkoxycarbonyl group each of 4 to 18 carbon atoms; and $X_1$ and n are as defined above.

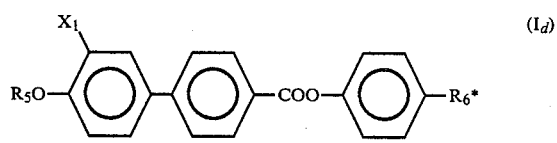

wherein $R_5$, $R_6^*$ and $X_1$ are as defined above.

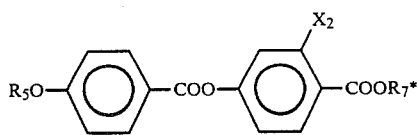

(I_e)

wherein R_7* represents an optically active alkyl group of 4 to 18 carbon atoms; X_2 represents a halogen atom; and R_5 is as defined above.

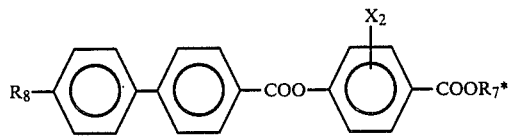

(I_f)

wherein R_8 represents an alkyl group or an alkoxy group each of 4 to 18 carbon atoms, and R_7* and X_2 are as defined above.

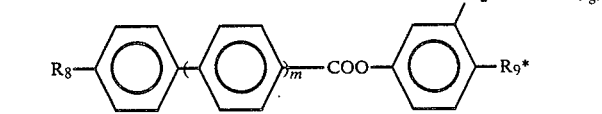

(I_g)

wherein R_8 represents an alkyl group or an alkoxy group each of 4 to 18 carbon atoms and R_9* and X_2 are as defined above.

Representative examples of the respective compounds have the following values of physical properties (phase transition points) shown in Tables 1~7.

TABLE 1

Phase Transition Points of Compounds of Formula (I_a)

| Sample No. | R_3* (in Formula II (I_a)) | X_1^1 | n | R_4 | C | S_B | Sc* | S_A | Ch | I |
|---|---|---|---|---|---|---|---|---|---|---|
| 1 | Me–CH–CH_2– (Et, *) | 3-F | 0 | –C_8H_17 | • 36.0 | — | — | — | — | • |
| 2 | " | 3-F | 0 | –OC_10H_21 | • 49.0 | — | — | — | — | • |
| 3 | " | 3-F | 1 | –C_8H_17 | • 105.5 | — | • 117.3 | — | • 131.5 | • |
| 4 | " | 3-F | 1 | –OC_8H_17 | • 113.0 | — | • 145.2 | — | • 161.0 | • |
| 5 | CH_3–CH–(CH_2)_6– (Et, *) | 3-F | 0 | –C_8H_17 | • 27.0 | — | • 36.6 | — | — | • |
| 6 | " | 3-F | 0 | –OC_8H_17 | • 52.4 | — | • 62.2 | — | — | • |
| 7 | " | 3-F | 0 | –OC_10H_21 | • 47.5 | — | • 64.5 | — | — | • |
| 8 | CH_3–CH– (C_6H_13, *) | 3-F | 0 | –C_8H_17 | • 11.5 | — | — | — | — | • |
| 9 | " | 3-F | 0 | –OC_5H_11 | • 15.0 | — | — | — | — | • |
| 10 | " | 3-F | 0 | –OC_10H_21 | • 32.5 | — | — | — | — | • |
| 11 | " | 3-F | 1 | –C_7H_15 | • 36.0 | • 68.2 | • 78.2 | — | • 85.4 | • |
| 12 | " | 3-F | 1 | –C_8H_17 | • 46.0 | — | • 78.2 | — | • 82.5 | • |
| 13 | CH_3–CH– (C_6H_13, *) | 3-F | 1 | –OC_6H_13 | • 86.0 | — | • 107.6 | — | • 117.8 | • |
| 14 | " | 3-F | 1 | –OC_8H_17 | • 64.5 | — | • 97.2 | — | • 99.8 | • |
| 15 | " | 3-F | 1 | –OC_12H_25 | • 60.8 | — | • 110.5 | — | — | • |
| 16 | Me–CH–(CH_2)_6– (Et, *) | 3-F | 0 | –CO_2C_8H_17 | • 42.0 | — | (• 38.3) | • 42.6 | — | • |
| 17 | Me–CH– (C_6H_13, *) | 3-F | 1 | –CO_2C_6H_13 | • 79.5 | — | — | • 85.7 | — | • |
| 18 | Me–CH– (C_6H_13, *) | 3-Cl | 1 | –C_7H_17 | • 52.5 | — | • 63.1 | — | • 67.2 | • |
| 19 | " | 3-Cl | 1 | –OC_4H_9 | • 95.3 | — | — | — | • 105.0 | • |
| 20 | " | 3-Cl | 1 | –OC_8H_17 | • 72.5 | — | • 95.2 | — | • 96.9 | • |
| 21 | " | 3-Cl | 1 | –OC_10H_21 | • 46.0 | — | • 99.0 | — | — | • |
| 22 | CH_3–CH– (C_6H_13, *) | 2-Cl | 1 | –OC_9H_19 | • 42.6 | — | • 49.3 | — | • 62.7 | • |
| 23 | " | 3-Br | 1 | –OC_8H_17 | • 58.0 | — | — | — | • 67.5 | • |

TABLE 1-continued

| Sample No. | Phase Transition Points of Compounds of Formula (I$_a$) in Formula II (I$_a$) | | | | Phase Transition Point (°C.) | | | | | |
|---|---|---|---|---|---|---|---|---|---|---|
| | R$_3$* | X$_1$[1] | n | R$_4$ | C | S$_B$ | Sc* | S$_A$ | Ch | I |
| 24 | " | 3-Br | 1 | —OC$_{12}$H$_{25}$ | • 44.0 | — | — | — | • 62.5 | • |

[1] As to the substitution site of X$_1$, the ortho position of R*O is denoted as 3-position, and the meta position thereof is denoted as 2-position.

TABLE 2

| Sample No. | Phase Transition Points of Compounds of Formula (I$_b$) in Formula (I$_b$) | | | Phase Transition Point (°C.) | | | | |
|---|---|---|---|---|---|---|---|---|
| | R$_3$* | X$_1$ | R$_4$ | C | Sc* | S$_A$ | Ch | I |
| 25 | Me<br>\|<br>Et—CH—CH$_2$—<br>* | Br | —OC$_8$H$_{17}$ | • 89.0 | • 94.8 | — | • 124.7 | • |
| 26 | Me<br>\|<br>Et—CH—(CH$_2$)$_5$—<br>* | F | —C$_5$H$_{11}$ | • 55.5 | • 140.4 | • 158.3 | — | • |
| 27 | " | F | —C$_8$H$_{17}$ | • 60.5 | • 144.3 | • 150.6 | — | • |
| 28 | " | F | —OC$_7$H$_{15}$ | • 82.5 | • 168.0 | • 172.0 | — | • |
| 29 | " | F | —OC$_{12}$H$_{25}$ | • 66.2 | • 157.8 | • 160.5 | — | • |
| 30 | " | F | —CO$_2$C$_5$H$_{11}$ | • 70.0 | • 134.1 | • 169.5 | — | • |
| 31 | Me<br>\|<br>C$_6$H$_{13}$CH—<br>* | F | —C$_6$H$_{13}$ | • 30.0 | • 60.4 | • 61.4 | • 83.0 | • |
| 32 | " | F | —C$_8$H$_{17}$ | • 38.0 | • 68.8 | • 78.4 | • 87.4 | • |
| 33 | " | F | —OC$_5$H$_{11}$ | • 56.0 | • 97.5 | — | • 111.7 | • |
| 34 | " | F | —OC$_8$H$_{17}$ | • 52.0 | • 103.9 | — | • 109.4 | • |
| 35 | " | F | —OC$_{10}$H$_{21}$ | • 61.5 | • 106.5 | — | • 107.6 | • |
| 36 | " | F | —CO$_2$C$_8$H$_{17}$ | • 54.4 | (• 50.0) | • 91.8 | — | • |

TABLE 3

| Sample No. | Phase Transition Points of Compounds of Formula (I$_c$) in Formula (I$_c$) | | | | Phase Transition Point (°C.) | | | | |
|---|---|---|---|---|---|---|---|---|---|
| | R$_5$ | X$_1$ | n | R$_6$* | C | Sc* | S$_A$ | Ch | I |
| 37 | C$_{12}$H$_{25}$ | F | 1 | Me<br>\|<br>—CH$_2$CH—Et<br>* | • 82.2 | • 106.7 | — | • 127.0 | • |
| 38 | C$_8$H$_{17}$ | F | 1 | Me<br>\|<br>—(CH$_2$)$_3$—CH—Et<br>* | • 90.3 | • 123.6 | — | • 139.3 | • |
| 39 | C$_{12}$H$_{25}$ | F | 1 | " | • 79.2 | • 122.5 | — | • 129.0 | • |
| 40 | C$_8$H$_{17}$ | F | 0 | Me<br>\|<br>—OCH$_2$—CH—Et<br>* | • 52.5 | — | — | — | • |
| 41 | C$_8$H$_{17}$ | F | 1 | " | • 94.1 | • 137.5 | — | • 156.5 | • |
| 41A | C$_{12}$H$_{25}$ | F | 0 | Me<br>\|<br>—O(CH$_2$)$_5$—CH—Et<br>* | • 46.6 | • 67.1 | — | — | • |
| 42 | C$_8$H$_{17}$ | F | 0 | Me<br>\|<br>—OCH—C$_6$H$_{13}$<br>* | • 35.0 | — | — | — | • |
| 43 | C$_{12}$H$_{25}$ | F | 0 | " | • 45.0 | — | — | — | • |
| 44 | C$_{12}$H$_{25}$ | F | 0 | Me<br>\|<br>—CO$_2$CH$_2$CH—Et<br>* | • 29.5 | (• 22.0) | • 48.7 | — | • |
| 45 | C$_{12}$H$_{25}$ | F | 1 | Me<br>\|<br>—CO$_2$CH$_2$CH—Et<br>* | • 57.0 | • 114.7 | • 150.1 | — | • |

TABLE 3-continued

Phase Transition Points of Compounds of Formula (I$_c$)

| Sample No. | R$_5$ | X$_1$ | n | R$_6$* | C | Sc* | S$_A$ | Ch | I |
|---|---|---|---|---|---|---|---|---|---|
| 46 | C$_8$H$_{17}$ | F | 1 | —CO$_2$CH(Me)—Et * | • 111.8 | (• 96.4) | • 139.3 | — | • |
| 47 | C$_{12}$H$_{25}$ | F | 1 | —CO$_2$CH(Me)—Et * | • 59.5 | • 98.8 | • 131.5 | — | • |
| 48 | C$_8$H$_{17}$ | F | 1 | —CO$_2$CH(Me)—C$_6$H$_{13}$ * | • 102.5 | (• 95) | • 114.8 | — | • |
| 49 | C$_{12}$H$_{25}$ | F | 1 | —CO$_2$CH(Me)—C$_6$H$_{13}$ * | • 70.0 | • 99.6 | • 104.3 | — | • |

TABLE 4

Phase Transition Points of Compounds of Formula (I$_d$)

| Sample No. | R$_5$ | X | R$_6$* | C | Sc* | S$_A$ | Ch | I |
|---|---|---|---|---|---|---|---|---|
| 50 | C$_8$H$_{17}$ | Cl | —CH$_2$CH(Me)—Et * | • 81.0 | • 84.7 | • 101.0 | • 116.5 | • |
| 51 | C$_{10}$H$_{21}$ | Cl | " | • 80.0 | • 81.8 | • 104.9 | • 112.4 | • |
| 52 | C$_8$H$_{17}$ | Br | " | • 88.5 | (• 68.5) | (• 83.7) | • 106.0 | • |
| 53 | C$_8$H$_{17}$ | Cl | —OCH$_2$CH(Me)—Et * | • 78.0 | • 114.0 | • 137.6° | — | • |
| 54 | C$_{10}$H$_{21}$ | Cl | " | • 64.5 | • 111.2 | • 131.9 | — | • |
| 55 | C$_8$H$_{17}$ | Br | " | • 89.5 | • 93.1 | • 122.2 | • 122.9 | • |
| 56 | C$_8$H$_{17}$ | F | —O(CH$_2$)$_5$—CH(Me)—Et * | • 80.0 | • 164.1 | • 173.6 | — | • |
| 57 | C$_8$H$_{17}$ | F | —OCH(CH$_3$)—C$_6$H$_{13}$ * | • 51.0 | • 100.5 | • 121.5 | — | • |
| 58 | C$_8$H$_{17}$ | Cl | " | • 59.7 | • 71.5 | • 91.6 | — | • |
| 59 | C$_{10}$H$_{21}$ | Cl | " | • 55.0 | • 78.1 | • 88.8 | — | • |
| 60 | C$_8$H$_{17}$ | F | —COOCH$_2$CH(Me)—Et * | • 61.4 | • 125.2 | • 170.2 | — | • |
| 61 | C$_{10}$H$_{21}$ | Cl | " | • 55.2 | • 65.5 | • 91.8 | — | • |
| 61A | C$_{10}$H$_{21}$ | Cl | —COOCH(CH$_3$)—C$_6$H$_{13}$ * | • 60.0 | • 72.1 | • 90.8 | — | • |

TABLE 5

Phase Transition Points of Compounds of Formula (I$_e$)

| Sample No. | R$_5$ | X$_2$ | R$_7$* | C | S$_F$* | Sc* | S$_A$ | Ch | I |
|---|---|---|---|---|---|---|---|---|---|
| 62 | C$_8$H$_{17}$ | F | —CH$_2$CH(Me)—Et * | • 44.0 | — | (• 26.0) | • 52.5 | — | • |

TABLE 5-continued

Phase Transition Points of Compounds of Formula (I$_e$)

| Sample No. | R$_5$ | X$_2$ | R$_7$* | C | S$_F$* | Sc* | S$_A$ | Ch | I |
|---|---|---|---|---|---|---|---|---|---|
| 63 | C$_{10}$H$_{21}$ | F | " | • 34.2 | — | • 35.2 | • 56.1 | — | • |
| 64 | C$_{12}$H$_{25}$ | F | " | • 36.0 | — | • 36.9 | • 59.2 | — | • |
| 65 | C$_{10}$H$_{21}$ | F | —(CH$_2$)$_3$CH(Me)—Et * | • 25.0 | — | • 42.7 | • 50.6 | — | • |
| 66 | C$_{12}$H$_{25}$ | F | —(CH$_2$)$_4$CH(Me)—Et * | • 33.0 | — | • 56.3 | • 59.1 | — | • |
| 67 | C$_8$H$_{17}$ | F | —CH(Me)—Et * | • 20.0 | — | (• 9.5) | • 34.5 | — | • |
| 68 | C$_{12}$H$_{25}$ | F | —CH(Me)—C$_3$H$_7$ * | • 23.1 | — | (• 13.0) | (• 22.5) | — | • |
| 69 | C$_{10}$H$_{21}$ | F | —CH(Me)—C$_4$H$_9$ * | • 10.0 | (• 7.1) | • 14.2 | • 20.0 | — | • |
| 70 | C$_{12}$H$_{25}$ | F | —CH(Me)—C$_6$H$_{13}$ * | • 22.5 | — | (• 19.2) | (• 20.3) | — | • |

TABLE 6

Phase Transition Points of Compounds of Formula (I$_f$)

| Sample No. | R$_8$ | X$_2$$^1$ | R$_7$* | C | S$_F$* | Sc* | S$_A$ | Ch | I |
|---|---|---|---|---|---|---|---|---|---|
| 71 | C$_7$H$_{15}$ | 3-F | —CH$_2$CH(Me)—Et * | • 34.6 | — | • 98.4 | • 153.7 | — | • |
| 72 | C$_8$H$_{17}$ | 3-F | " | • 42.5 | — | • 104.5 | • 150.2 | — | • |
| 73 | C$_{12}$H$_{25}$ | 3-F | " | • 32.0 | — | • 94.2 | • 142.5 | — | • |
| 74 | C$_8$H$_{17}$O— | 2-F | " | • 71.5 | — | • 84.7 | • 152.6 | • 154.5 | • |
| 75 | C$_8$H$_{17}$O— | 3-F | " | • 58.0 | — | • 142.6 | • 183.5 | — | • |
| 76 | C$_{10}$H$_{21}$O— | 3-F | " | • 54.5 | — | • 142.0 | • 177.3 | — | • |
| 77 | C$_6$H$_{13}$O— | 2-Cl | " | • 55.7 | — | — | • 126.0 | • 136.3 | • |
| 78 | C$_7$H$_{15}$O— | 2-Cl | " | • 58.0 | — | (• 39.5) | • 125.6 | • 133.0 | • |
| 79 | C$_{10}$H$_{21}$O— | 2-Cl | " | • 63.1 | — | • 69.5 | • 125.3 | • 126.7 | • |
| 80 | C$_{10}$H$_{21}$O— | 3-F | —(CH$_2$)$_3$CH(Me)—Et * | • 41.6 | — | • 110.0 | • 142.5 | — | • |
| 81 | C$_8$H$_{17}$— | 3-F | —(CH$_2$)$_4$CH(Me)—Et * | • 69.5 | — | • 107.2 | • 140.3 | — | • |
| 82 | C$_8$H$_{17}$O— | 3-F | " | • 79.5 | — | • 145.3 | • 174.2 | — | • |
| 83 | C$_7$H$_{15}$ | 3-F | —CH(Me)—Et * | • 68.4 | • 77.0 (SE) | — | • 134.4 | — | • |
| 84 | C$_{10}$H$_{21}$O— | 3-F | " | • 37.5 | • 113.6 | • 129.8 | • 165.2 | — | • |
| 85 | C$_8$H$_{17}$O— | 3-F | —CH(Me)—C$_3$H$_7$ * | • 41.0 | • 135.1 | — | • 150.6 | — | • |

TABLE 6-continued

Phase Transition Points of Compounds of Formula (I$_f$)

| Sample No. | in Formula (I$_f$) | | | Phase Transition Points (°C.) | | | | | |
|---|---|---|---|---|---|---|---|---|---|
| | R$_8$ | X$_2^1$ | R$_7$* | C | S$_F$* | Sc* | S$_A$ | Ch | I |
| 86 | C$_{12}$H$_{25}$— | 3-F | Me<br>\|<br>—CH—C$_4$H$_9$<br>* | • 25.5 | • 70.5 | • 81.8 | • 102.7 | — | • |
| 87 | C$_7$H$_{15}$O— | 3-F | " | • 69.2 | • 127.7 | — | • 157.4 | — | • |
| 88 | C$_7$H$_{15}$ | 3-F | Me<br>\|<br>—CH—C$_6$H$_{13}$<br>* | • 28.0 | • 73.8 | • 74.7 | • 107.4 | — | • |
| 89 | C$_{12}$H$_{25}$ | 3-F | " | • 29.5 | • 67.4 | • 82.4 | • 92.6 | — | • |
| 90 | C$_7$H$_{15}$O— | 3-F | " | • 66.5 | • 120.4 | • 121.2 | • 145.4 | — | • |
| 91 | C$_8$H$_{17}$O— | 3-F | " | • 36.3 | • 123.4 | • 124.2 | • 142.1 | — | • |
| 92 | C$_{10}$H$_{21}$O— | 3-F | " | • 30.5 | • 118.4 | • 123.4 | • 133.4 | — | • |

$^1$As to the substitution site of X$_2$, the ortho position of —CO$_2$R* group is denoted as 3-position, and the meta position thereof is denoted as 2-position.

TABLE 7

Phase Transition Points of Compounds of Formula (I$_g$)

| Sample No. | in Formula (I$_g$) | | | Phase Transition Points (°C.) | | | | | |
|---|---|---|---|---|---|---|---|---|---|
| | R$_8$ | m | X | R$_9$* | C | S$_F$* | Sc* | S$_A$ | Ch | I |
| 93 | C$_8$H$_{17}$O— | 1 | F | Me<br>\|<br>—(CH$_2$)$_2$—CH—Et<br>* | • 58.0 | • 65.0 | • 136.8 | • 174.1 | — | • |
| 94 | C$_{12}$H$_{25}$— | 1 | F | Me<br>\|<br>—(CH$_2$)$_5$—CH—Et<br>* | • 47.5 | — | • 103.3 | • 120.0 | — | • |
| 95 | C$_{10}$H$_{21}$O— | 0 | F | " | • 39.4 | — | (• 38.9) | • 50.0 | — | • |
| 96 | C$_8$H$_{17}$O— | 1 | F | " | • 81.0 | — | • 127.8 | • 164.8 | — | • |
| 97 | C$_7$H$_{15}$O— | 1 | F | Me<br>\|<br>—OCH—C$_6$H$_{13}$<br>* | • 68.5 | — | • 96.6 | • 150.4 | — | • |

Compounds of the formula (I) wherein m=n=0, i.e. those having only two benzene rings, have generally a preferred property of low melting points, but their upper limit temperatures of Sc* phase are so low that in many cases, it is impossible to observe Sc* phase in the case of a single substance. However, such compounds, due to their low temperatures, can be utilized for lowering the melting points of ferroelectric liquid crystal compositions. On the other hand, compounds of the formula (I) having three benzene rings have higher upper limit temperatures of Sc* phase, and among these compounds, those having no unfavorably high melting points are useful as a main component for constituting liquid crystal compositions.

Next, the effectiveness of having a halogen atom as a lateral substituent on the benzene ring will be described. Table 8 shown below illustrates the phase transition points and the spontaneous polarization values (Ps) of halogen-substituted compounds and halogen-unsubstituted compounds (parent compounds). Such a halogen introduction reduces the melting points of the parent compounds in most cases, but raises them in some cases. As to the compounds of the types shown in Table 8, when the halogen is F or Cl, a preferred rise in the upper limit temperature of Sc* phase is observed. Whereas when the halogen is Br, the upper limit temperature of Sc* phase is notably reduced to make impossible its observation. The effectiveness of these halogens cannot be naturally anticipated, but it can be said that F and Cl have a particularly preferred effectiveness. As to the Ps value, it has been found that those of halogen-substituted compounds increase to about twice those of halogen-unsubstituted compounds.

TABLE 8

| Sample No. | Halogen-substituted compounds | Ps (nC/cm$^2$) | Halogen-unsubsitituted compounds | Ps (nC/cm$^2$) |
|---|---|---|---|---|
| 13 | C$_6$H$_{13}$CH—O—⟨⟩—COO—⟨⟩—⟨⟩—OC$_6$H$_{13}$ with CH$_3$ and F substituents<br>C 86°, Sc* 107.6°, Ch 117.8°, I | 89.7 | C$_6$H$_{13}$CH—O—⟨⟩—COO—⟨⟩—⟨⟩—OC$_6$H$_{13}$ with CH$_3$ substituent<br>*<br>C 74.0°, Sc* 84.5°, Ch 140.5°, I | 47 |

TABLE 8-continued

| Sample No. | Halogen-substituted compounds | Ps (nC/cm²) | Halogen-unsubsitituted compounds | Ps (nC/cm²) |
|---|---|---|---|---|
| 14 | 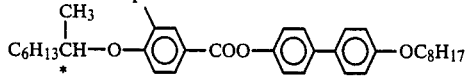 C 64.5°, Sc* 97.4°, Ch 99.8°, I | 77.9 | 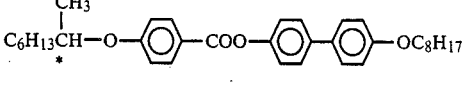 | 46 |
| 20 | 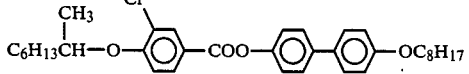 C 72.5°, Sc* 95.2°, Ch 96.9°, I | 122.7 | " | " |
| 23 | 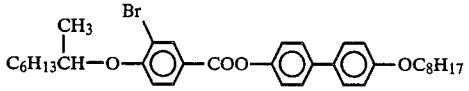 C 58.0°, Ch 67.5°, I | —* | " | " |

Ps: Spontaneous polarization in units of nanocoulomb/cm² at T − Tc = −10° C. (T: measured temperature, Tc: crystallization temperature)
*(Ps cannot be measured due to absence of Sc*.)

Table 9 shows other comparison examples of halogen-substituted compounds and halogen-unsubstituted ones. As to the compounds of these types, too, the presence of halogen atom reduces the melting points of the parent compounds in most cases, and raises the upper limit temperature of Sc*. The clearing point (Ch-I point) generally lowers, but only this fact is a fact anticipated from the so far known rule. The Ps value is also raised, but the effectiveness in this case is not so notable as that in the case of the compounds of the types shown in Table 8.

The above preferred effectiveness of the introduction of halogen atom, particularly F atom, upon the phase transition points is also observed in the comparisons shown in Table 10. However, in the case of compounds shown in Table 11, having only two benzene rings, F atom introduction lowers the melting points of the parent compounds, but also lowers the upper limit temperatures of Sc*. As seen from these facts, the effect of the introduction of the lateral halogen atom upon the phase transition points is delicate; thus it is the present status that anticipation is impossible without actual measurements. In addition, the compounds described in Tables 10 and 11 have Ps values as small as 3~4 nanocoulomb/cm²; hence the effect of F atom introduction upon increase in the spontaneous polarization is immaterial, if any.

TABLE 9

| Sample No. | Halogen-substituted compounds | Ps (nC/cm²) | Halogen-unsubstituted compounds | Ps (nC/cm²) |
|---|---|---|---|---|
| 32 | 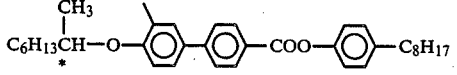 C 38.0°, Sc* 68.8°, S_A 78.4°, Ch 87.4°, I | 52~107 | 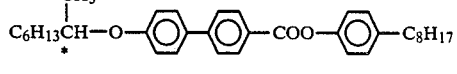 C 55.0°, Sc* 71.5°, S_A 83.6°, Ch 92.3°, I | 36~85 |
| 33 | 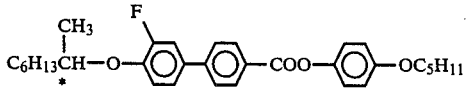 C 56.0°, Sc* 97.5°, Ch 111.7°, I | 71~132 | 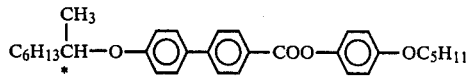 C 76.0°, Sc* 93.0°, Ch 121.6°, I | 70~110 |
| 34 | 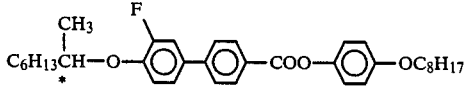 C 52.0°, Sc* 103.9°, Ch 109.4°, I | 70~130 | 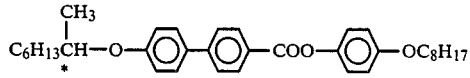 C 78.7°, Sc* 103.3°, Ch 120.8°, I | 66~95 |

Ps: Values at T − Tc = −5° C.~−30° C. (the former numerals: measured values at T −Tc = −5° C. and the latter: those at T −Tc = −30° C.) nanocoulomb/cm² (nC/cm²)

TABLE 10

| Sample No. | Halogen-substituted compounds | Halogen-unsubstituted compounds |
|---|---|---|
| 71 | 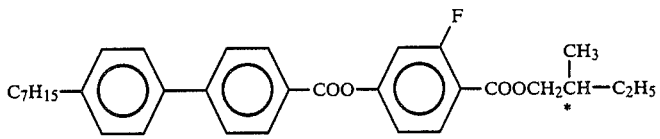<br>C 34.6°, Sc* 98.4°, S_A 153.7°, I | C 62°, Sc* 90°, S_A 158°, I |
| 72 | 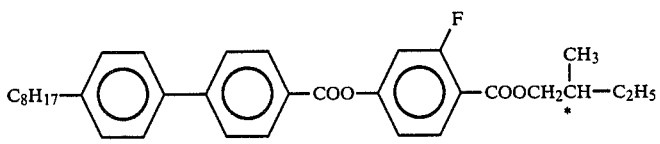<br>C 42.5°, Sc* 104.5°, S_A 150.2°, I | C 67°, Sc* 101°, S_A 153°, I |
| 73 | 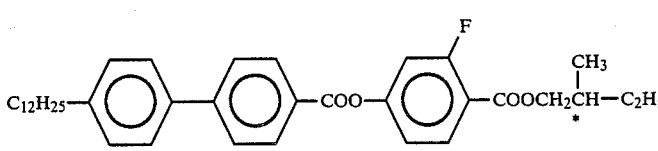<br>C 32.0°, Sc* 94.2°, S_A 142.5°, I | C 42°, Sc* 81°, S_A 175°, I |
| 75 | 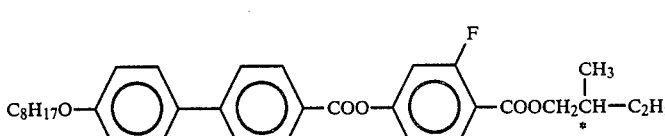<br>C 58.0°, Sc* 142.6°, S_A 183.5°, I | C 64°, Sc* 139°, S_A 189°, I |

TABLE 11

| Sample No. | Halogen-substituted compounds | Halogen-unsubstituted compounds |
|---|---|---|
| 62 | 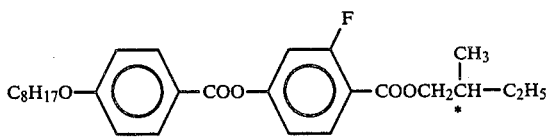<br>C 44.0° (Sc* 26.0°) S_A 52.5°, I | C 34°, (Sc* 30°), S_A 55°, I |
| 63 | 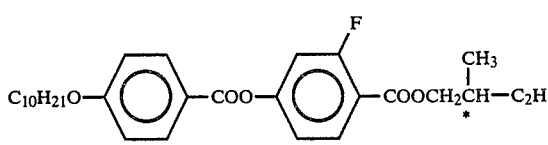<br>C 34.2°, Sc* 35.2°, S_A 56.7°, I | C 51°, (Sc* 38°), S_A 58°, I |
| 64 | 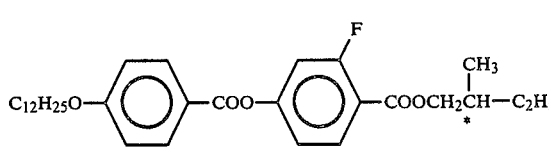<br>C 36.0°, Sc* 36.9°, S_A 59.2°, I | C 47°, (Sc* 37°), S_A 59°, I |

The compounds of the formula (I) may be prepared through the following passageways:

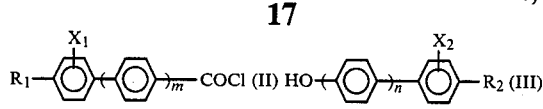

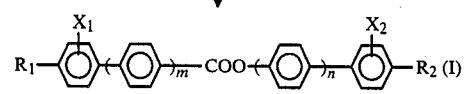

Namely, they may be prepared by reacting an acid halide of substituted benzoic acids or substituted biphenylcarboxylic acids as expressed by the formula (II) with a substituted phenol or substituted phenylphenol as expressed by the formula (III), in a basic solvent such as pyridine.

Among the acid halides of carboxylic acids (II) as one of the raw materials, those wherein $X_1=$3-halogen and $R_1=$alkyloxy group may be prepared using a known carboxylic acid (I) wherein $X_1=$H as raw material, according to the following steps:

(1)

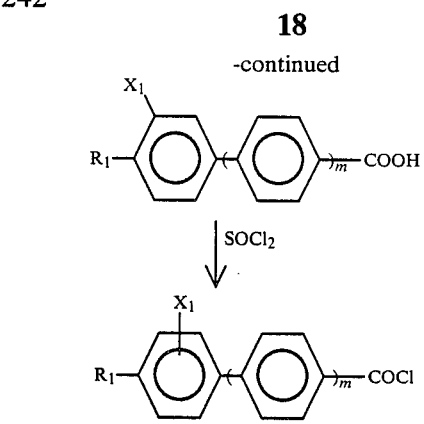

Namely, a p-alkoxy-substituted-benzoic acid or a p-alkoxy-substituted-biphenylcarboxylic acid (I) is reacted with a halogenating agent such as bromine, chlorine, N,N-dichloro-p-toluenesulfonamide, etc. for introducing a halogen atom to prepare a compound (2). However, among compounds (II), those wherein $X_1=$3-F are preferred to be prepared according to the following steps:

In case of m=0,

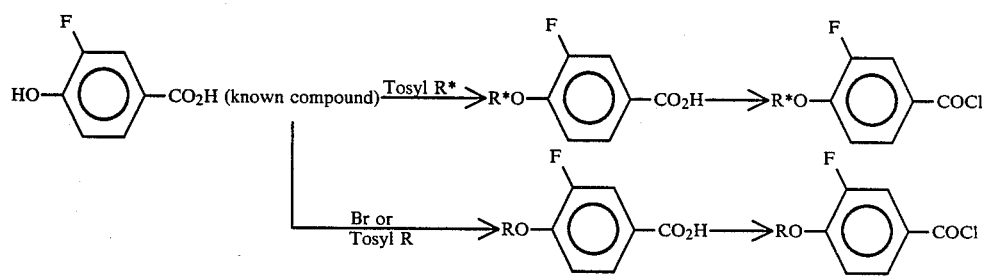

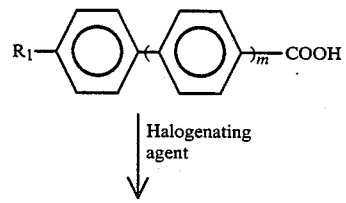

In case of m=2,

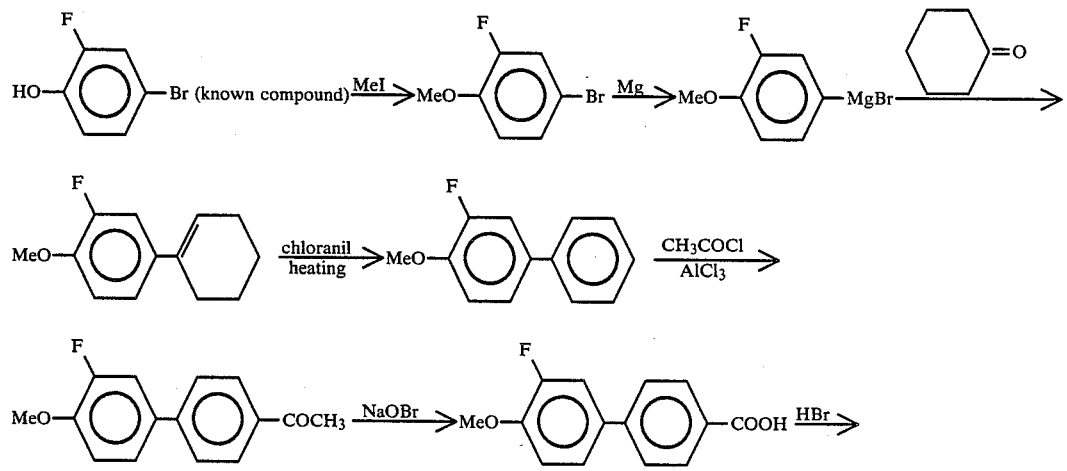

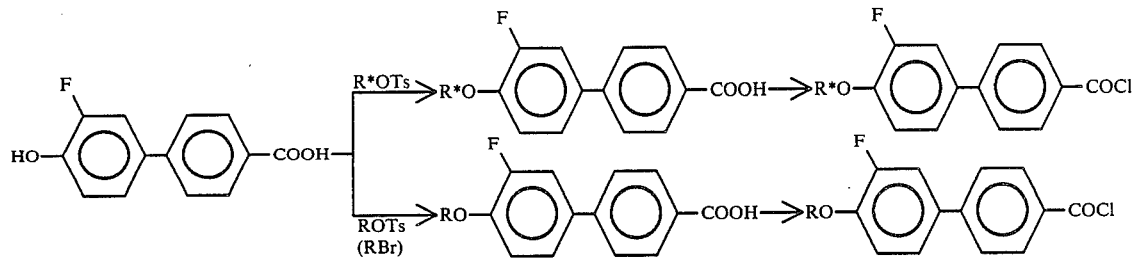

Among compounds of (II), those wherein $X_1 = 2$-halogen and $R_1 =$ alkyloxy group may be prepared from

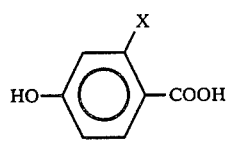

(known compound) in the same manner as above.

The substituted benzoic acids and substituted biphenylcarboxylic acids expressed by the formula (II) include the following compounds:

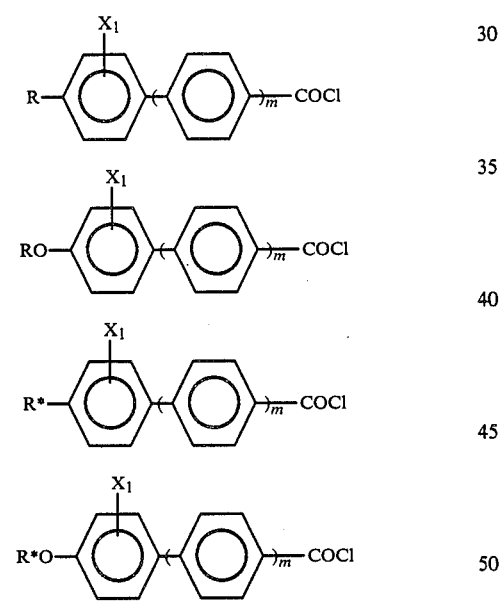

Further, the substituted phenols or substituted phenylphenols expressed by the formula (III) as another of the raw materials include the following compounds:

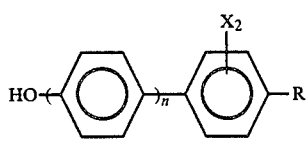

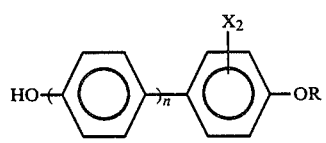

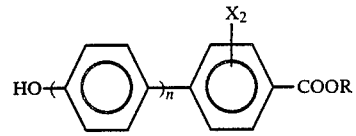

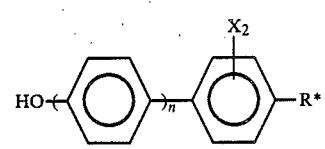

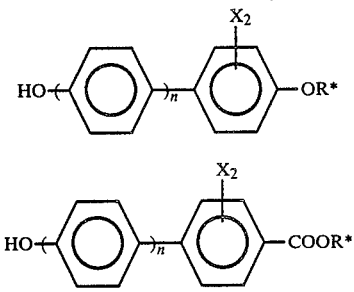

In the above formulas, R represents an alkyl group; R*, an optically active alkyl group of 4 to 18 carbon atoms; $X_2$, a halogen atom or hydrogen atom; and n, 0 or 1.

In the above formulas, preparation of compounds wherein $X_2 =$ H is known; thus that of compounds wherein $X_2 =$ halogen will be described below.

(i) In case of $R_2 =$ alkyl,

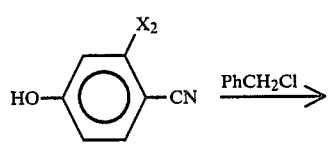

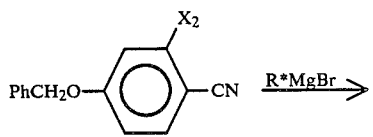

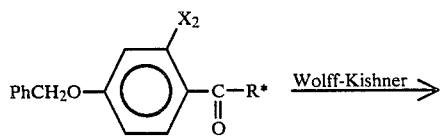

-continued

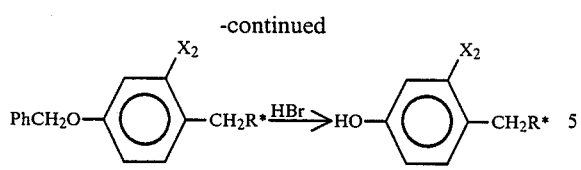

(ii) In case of $R_2$=alkoxy,

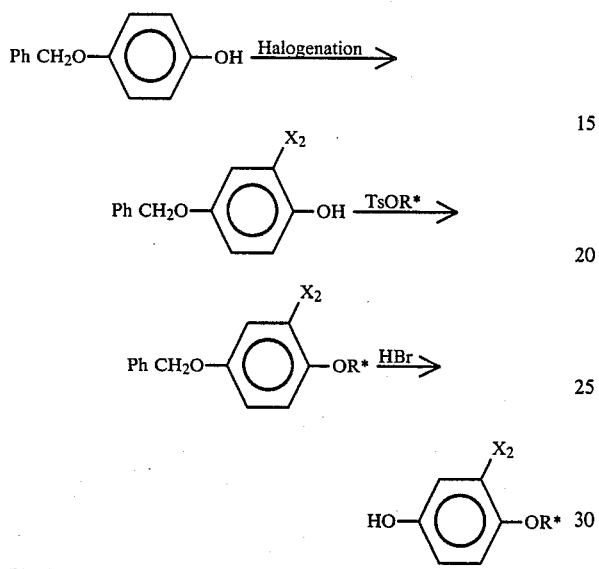

(Ph: phenyl group)

However, in case of $X_2$=F, the following route according to the method of C. Niemann et al (J.A.C.S. 63, 609 (1941)) is suitable:

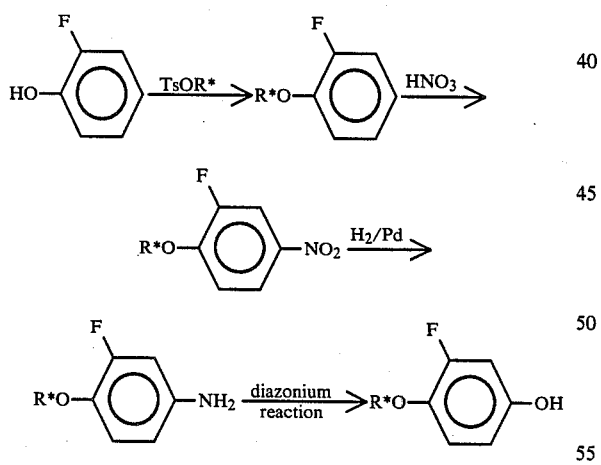

(iii) In case of $R_2$=alkoxycarbonyl, if the alkyl group of the alkoxycarbonyl (—COOR) is a primary alkyl group,

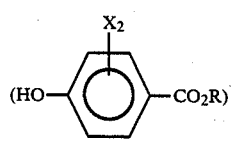

may be prepared by known acid-catalyzed esterification of the above 2- or 3-halogeno-4-hydroxybenzoic acid, but if the alkyl group thereof is a secondary alkyl group, it is necessary to employ the following method:

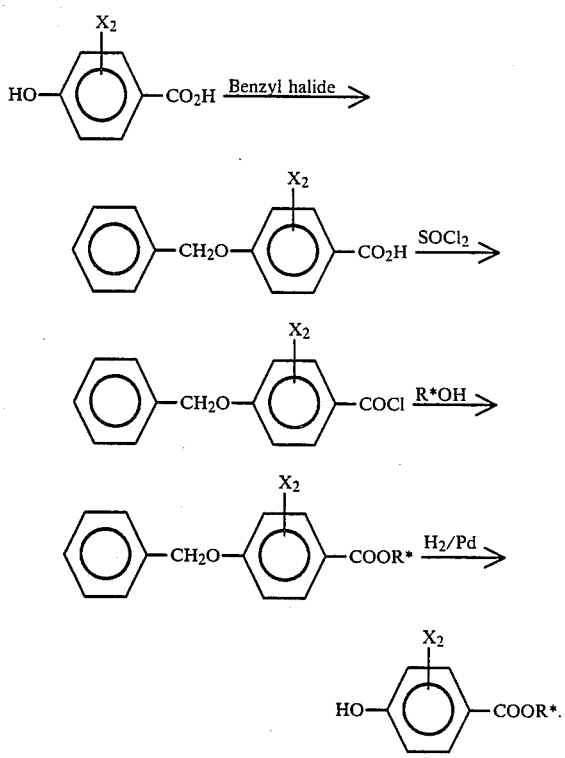

The optically active ester liquid crystal compounds of the present invention will be described in more detail by way of Examples.

In the succeeding Examples there are described only those using S-type compounds as the optically active alcohol for the raw material, but even when R-type optically active alcohols are used as the raw material, products having the same phase transition points as those in the S-type case are obtained. This is also theoretically natural. However, the angle of rotation, the helical twist direction and the direction of the spontaneous polarization in the R-type case are reversed with respect to those of the S-type.

EXAMPLE 1

Preparation of optically active
3-fluoro-4-(1-methyl-heptyloxy)-benzoic acid
4'-octyloxy-4-biphenyl ester (a compound of the formula ($I_a$) wherein n=1,

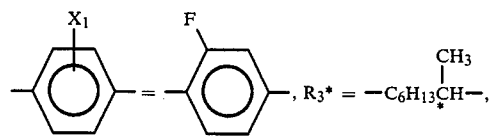

$R_4$=—$OC_8H_{17}$; sample No. 14)

(i) S(+)-2-octanol (200 g, 1.536 mol) was dissolved in dry pyridine (600 ml), followed by dropwise adding to the solution, a solution of p-toluenesulfonyl chloride (292.8 g, 1.536 mol) dissolved in dry toluene (440 ml) while keeping the temperature of the system at 10° C. or lower, agitating the mixture at room temperature for one hour, raising the temperature of the system up to 50° C., keeping the material, as it was, for 2 hours, thereafter cooling, further adding water (1 l) and toluene (500 ml) with stirring, washing the separated toluene layer with 6N-HCl, then with 2N-NaOH aqueous solution and further with water till the washing liquid became neutral, and distilling off toluene to obtain as a residue, optically active p-toluenesulfonic acid 1-methyl-heptyl ester (321.0 g).

(ii) On the other hand, o-fluorophenol (500 g, 4.46 mols) was added to a solution of NaOH (1,250 g, 31.26 mols) dissolved in water (2 l), followed by dropwise adding chloroform (1,230 g), agitating the mixture at about 60° C. for 2 hours, acidifying it with sulfuric acid, filtering off the residue on heating, and recrystallizing the deposited crystals from a mixed solvent of water-methanol to obtain 3-fluoro-4-hydroxybenzaldehyde (35.3 g) having a m.p. of 119.5°~123.5° C. This product (30 g, 0.21 mol) was dissolved in methanol (300 ml), followed by adding and dissolving KOH (12 g, 0.21 mol), dropwise adding optically active p-toluenesulfonic acid 1-methyl-heptyl ester (65 g, 0.23 mol) prepared above, keeping the mixture under reflux for 4 hours, cooling, adding toluene (200 ml) and 6N-HCl (100 ml), washing the resulting toluene layer with 2N-NaOH aqueous solution, further washing with water till the washing layer became neutral, and distilling off toluene to obtain as residue, optically active 3-fluoro-4-(1-methyl-heptyloxy)-benzaldehyde (14.7 g). This product (10 g, 0.04 mol) was dissolved in acetic acid (200 ml), followed by dropwise adding a solution of chromic anhydride (4 g, 0.04 mol) dissolved in acetic acid (50 ml) and water (40 ml), agitating the mixture at 40°~50° C. for about 6 hours, pouring the resulting reaction material in ice water and filtering off the deposited crystals to obtain optically active 3-fluoro-4-(1-methyl-heptyloxy-benzoic acid (6.1 g) having a m.p. of 57.2°~59.2° C., adding thionyl chloride (4.2 g, 0.035 mol) to the above product (6 g, 0.022 mol), heating the mixture under reflux with stirring for one hour, and distilling off excess thionyl chloride to obtain optically active 3-fluoro-4-(1-methyl-heptyloxy)benzoic acid chloride (6.1 g).

(iii) Further, 4-(4'-octyloxyphenyl)phenol (11.2 g, 0.039 mol) was dissolved in pyridine (10 ml), followed by adding to the solution, optically active 3-fluoro-4-(1-methyl-heptyloxy)-benzoic acid chloride (10 g, 0.035 mol) prepared above, agitating the mixture at 50°~60° C. for about 2 hours, allowing it to stand overnight, adding toluene (300 ml) and water (200 ml), washing the toluene layer with 6N-HCl, then with 2N-NaOH aqueous solution and further with water till the washing water became neutral, distilling off toluene and recrystallizing the residue from ethanol to obtain the objective optically active 3-fluoro-4-(1-methyl-heptyloxy)-benzoic acid 4'-octyloxy-4-biphenyl ester (2.3 g). The phase transition points of this product were as follows: C-S$_c$* point 64.5° C., S$_c$*-I point 99.8° C.

Further, the values of elemental analysis of this compound accorded well with the calculated values as follows:

|   | Observed values | Calculated values in terms of C$_{35}$H$_{45}$O$_4$F |
|---|---|---|
| C | 76.10% | 76.41% |
| H | 8.00% | 8.27% |
| F | 3.20% | 3.46% |

EXAMPLE 2

Preparation of optically active 3'-chloro-4'-octyloxy-4-biphenylcarboxylic acid p-(1-methylheptyloxy)-phenyl ester (a compound of the formula (I$_d$) wherein X$_1$=Cl, R$_5$=C$_8$H$_{17}$—,

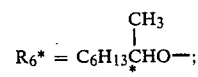

sample No. 58)

(i) N,N-dichloro-p-toluenesulfonamide (hereinafter abbreviated to "dichloramine T") (7.5 g, 0.032 mol) was dissolved in acetic acid (100 ml), followed by adding to the solution, hydrochloric acid (0.4 ml), dropwise adding to the acetic acid solution of dichloramine T, a solution of 4'-octyloxy-4-biphenycarboxylic acid (20 g, 0.063 mol) dissolved in acetic acid (100 ml), refluxing the mixture, allowing it to stand overnight, distilling off acetic acid and filtering off deposited crystals to obtain 3'-chloro-4'-octyloxy-4-biphenylcarboxylic acid (14.8 g) (C-Sc 146° C., S$_c$'N' 224° C. and N'-I 232° C.).

(ii) Hydroquinone monobenzyl ether (50 g, 0.25 mol) was added to ethanol (250 ml), followed by adding to the solution, NaOH (12 g, 0.30 mol) and optically active p-toluenesulfonic acid 1-methyl-heptyl ester (78 g, 0.274 mol) prepared in Example 1 with stirring, refluxing the mixture for about 10 hours, distilling off ethanol, adding 6N-HCl (250 ml) and toluene (500 ml) to carry out extraction with toluene, washing the toluene layer with 2N-NaOH aqueous solution, then with water till the washing water became neutral, and distilling off the solvent to obtain optically active p-(1-methyl-heptyloxy)-phenol benzyl ether (76 g). This product (50 g, 0.16 mol) was dissolved in ethanol (100 ml) and reduced in the presence of Pd/C catalyst to obtain optically active p-(1-methylheptyloxy)-phenol (24 g) having a b.p. of 162°–165° C./6 mmHg.

Next, thionyl chloride (5.0 g, 0.042 mol) was added to 3'-chloro-4-octyloxy-4-biphenylcarboxylic acid (10 g, 0.026 mol) prepared previously, followed by heating the mixture under reflux for one hour and distilling off excess thionyl chloride to obtain 3'-chloro-4'-octyloxy-4-biphenylcarboxyl chloride (11 g).

This product (20 g, 0.05 mol) was added to a solution of optically active p-(1-methyl-heptyloxy)-phenol (12 g, 0.06 mol) prepared previously in pyridine (5 ml), followed by reacting the mixture at 50°–60° C. for 2 hours, heating with stirring, allowing to stand overnight, adding toluene (30 ml) and water (20 ml), agitating the mixture, washing the toluene layer with 6N-HCl, then with 2N-NaOH aqueous solution and further with water till the washing water became neutral, distilling off toluene and recrystallizing the residue from ethanol to obtain the objective optically active 3'-chloro-4'-octyloxy-4-biphenylcarboxylic acid p-(1-methyl-heptyloxy)-phenyl ester (11 g). The phase transition points of this product were as follows: C-S$_c$* point 59.7° C., S$_c$*-S$_A$ point 71.9° C., S$_A$-I point 91.2° C.

Further the values of elemental analysis thereof accorded well with the calculated values as follows:

|   | Observed values | Calculated values (in terms of C$_{35}$H$_{45}$O$_4$Cl) |
|---|---|---|
| C | 74.20% | 74.38% |

| | Observed values | Calculated values (in terms of $C_{35}H_{45}O_4Cl$) |
|---|---|---|
| H | 7.90% | 8.03% |
| Cl | 6.20% | 6.27% |

EXAMPLE 3

Preparation of optically active 4'-decyloxy-4-biphenylcarboxylic acid 2-chloro-4-(2'-methylbutoxycarbonyl)-phenyl ester (a compound of the formula (I$_f$) wherein

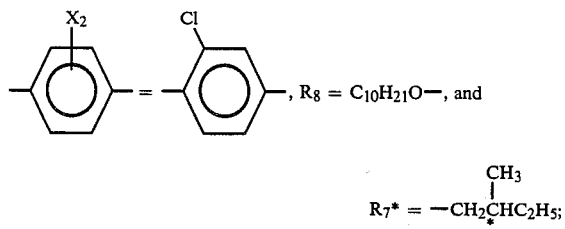

$R_8 = C_{10}H_{21}O-$, and $$R_7^* = -CH_2\overset{CH_3}{\underset{*}{C}H}C_2H_5;$$

sample No. 79)

To p-hydroxybenzoic acid (113 g, 0.82 mol) were added S(−)-2-methyl-butanol (273 g, 3.1 mols), conc. sulfuric acid (25 ml) and benzene (300 ml), followed by refluxing the mixture for 16 hours, cooling, thereafter adding toluene (1 l), washing the toluene layer with 2% NaHCO$_3$ aqueous solution and further with water till the washing water became neutral, distilling off toluene and recrystallizing from ethanol to obtain optically active p-hydroxy-benzoic acid 2-methyl-butyl ester (55 g).

On the other hand, dichloroamine T (28.0 g, 0.12 mol) was dissolved in acetic acid (450 ml), and hydrochloric acid (1.5 ml) was added. The resulting solution was dropwise added to a solution of the above p-hydroxybenzoic acid 2-methyl-butyl ester (50 g, 0.24 mol) dissolved in acetic acid (450 ml), followed by refluxing the mixture, allowing to stand overnight, distilling off acetic acid and filtering off deposited crystals to obtain 3-chloro-4-hydroxy-benzoic acid 2-methyl-butyl ester (42 g) (b.p. 135°~138° C./4 mmHg).

On the other hand, thionyl chloride (5.0 g, 0.042 mol) was added to 4'-decyloxy-4-biphenylcarboxylic acid (10 g, 0.028 mol), followed by heating the mixture under reflux for one hour, and distilling off thionyl chloride to obtain 4'-decyloxy-4-biphenylcarboxyl chloride (10 g).

Optically active 3-chloro-4-hydroxy-benzoic acid 2-methyl-butyl ester (10.0 g, 0.041 mol) prepared previously was dissolved in pyridine (50 ml), followed by dropwise adding to the solution, 4'-decyloxy-4-biphenylcarboxyl chloride (14.2 g, 0.038 mol), followed by reacting the mixture at 50°~60° C. for 2 hours, allowing it to stand overnight, adding toluene (300 ml) and water (200 ml), agitating the mixture, washing the toluene layer with 6N-HCl, then with 2N-NaOH aqueous solution and further with water till the washing water became neutral and recrystallizing the residue from ethanol to obtain optically active 4'-decyloxy-4-biphenylcarboxylic acid 2-chloro-4-(2'-methoxy-butoxy-carbonyl)phenyl ester (7.2 g). The phase transition points of this product were as follows: C-S$_c$* point 63.1° C., S$_c$*-Ch point 70.2° C., Ch-S$_A$ point 126.5° C. and Ch-I point 128.2° C. Further the values of elemental analysis thereof accorded well with the calculated values as follows:

| | Observed values | Calculated values (in terms of $C_{35}H_{43}O_5Cl$) |
|---|---|---|
| C | 72.10% | 72.28% |
| H | 7.20% | 7.43% |
| Cl | 6.00% | 6.12% |

EXAMPLE 4

Preparation of optically active 3'-fluoro-4'-(6''-methyl-octyloxy)-4-biphenylcarboxylic acid p-pentylphenyl ester (a compound of the formula (I$_b$) wherein $X_1 = F$, $R_3^* = EtCH(Me)-(CH_2)_5-$ and $R_4 = C_5H_{11}$; sample No. 26)

(i) 3-Fluoro-4-methoxy-biphenyl o-Fluoro-p-bromoanisole, b.p. 65°~66° C. (4.5 mmHg), prepared by usual methylation of known o-fluoro-p-bromophenol, b.p. 61° C. (3.0 mmHg) was converted to m-fluoro-p-anisylmagnesium bromide in ethyl ether. The resulting Grignard reagent (1 mol) was cooled and thereto was dropwise added cyclohexanone (one mol) below 7° C., and the mixture stirred for ½ hr at room temperature, acidified with dilute hydrochloric acid and heated with stirring under reflux for 1 hr. The organic layer was separated, washed with water, and the ether was removed in dryness. The residue was recrystallized from ethanol (600 ml) to obtain colorless crystals (96 g), m.p. 49°~50° C. This product was found to be m-fluoro-p-anisylcyclohexene-1, not the cyclohexanol-1.

This cyclohexene-1 (0.46 mol) was aromatized by heating with chloranil (0.97 mol) in xylene (700 ml) under reflux for 4 hours. Tetrachlorohydroquinone was removed by filtration, the filtrate washed with 1N aqueous sodium hydroxide, and the solvent stripped by vacuum evaporation. The residual solids, after passing through a chromatographic column of alumina in toluene solution, was recovered in the usual way, and twice recrywtallized from ethanol to yield 3-fluoro-4-methoxybiphenyl (60 g), m.p. 84.5°~86° C.

(ii) 3'-Fluoro-4'-hydroxy-4-biphenylcarboxylic acid

3-Fluoro-4-methoxybiphenyl was acetylated with acetyl chloride/AlCl$_3$ in carbon disulfide in the usual way. The product was twice recrystallized from toluene to obtain 3'-fluoro-4'-methoxy-4-acetylbiphenyl (yield: 82%), m.p. 149°~149.5° C.

The acetylbiphenyl dissolved in p-dioxane was oxidized with sodium hypobromite in aqueous NaOH in the usual way. The product was recrystallized from acetic acid to give 3'-fluoro-4'-methoxy-4-biphenylcarboxylic acid (yield: 89%), m.p. 253° C., clearing point 270° C.

This product was demethylated by boiling with hydrobromic acid/acetic acid for 60 hours, and the resulting material was recrystallized from acetic acid to give 3'-fluoro-4'-hydroxy-4-biphenylcarboxylic acid (yield: 94%), m.p. 254°~256° C., clearing point 261°~267° C.

(iii) S-3'-fluoro-4'-(6''-methyl-octyloxy)-4-biphenylcarboxylic acid

3'-Fluoro-4'-hydroxy-4-biphenylcarboxylic acid (7.0 g), KOH (1.8 g) and S-6-methyl-octyl bromide (6.6 g) in ethanol were heated under reflux for 5 hours, followed by adding KOH (0.9 g) and S-6-methyl-octyl bromide (3.3 g) and continuing the reaction for further 5 hours. The resulting mixture was worked up in the usual way.

The product was recrystallized from acetic acid, and showed C-S point 154° C. and S-I point 238°~239° C.

(iv) S-3'-fluoro-4'-(6''-methyl-octyloxy)-4-biphenylcarboxylic acid p-pentylphenyl ester The fluoro-biphenylcarboxylic acid prepared above (step iii) was converted to the acid chloride with thionyl chloride in the usual way. This acid chloride (10 g, 0.029 mol) was heated with p-pentylphenol (10.0 g, 0.061 mol) in pyridine at 50°~60° C. for 2 hours. The product was isolated in the usual way, and recrystallized from ethanol, to obtain the captioned compound (6.7 g). Its phase transition points were as follows: C-$S_c$*. 55.5° C., $S_c$*-$S_A$. 140.4° C. and $S_A$-I. 158.3° C., as listed in Table 2.

| | Elemental analysis | |
|---|---|---|
| | Observed values | Calculated values (in terms of $C_{33}H_{41}O_3F$) |
| C | 78.40% | 78.30% |
| H | 8.10% | 8.19% |
| F | 3.50% | 3.55% |

EXAMPLE 5

Preparation of optically active m-fluoro-p-dodecyloxybenzoic acid 4'-(1-methyl-propyloxycarbonyl)-4-biphenylyl ester (a compound of the formula ($I_c$) wherein N=1, $X_1$=F, $R_5$=$R_{12}H_{25}$ and

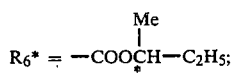

sample No. 47)

(i) S-4'-hydroxy-4-biphenylcarboxylic acid 1-methylpropyl ester.

4'-Benzyloxy-4-biphenylcarboxylic acid, prepared by benzylation of 4'-hydroxy-4-biphenylcarboxylic acid, was recrystallized from a methyl cellosolve-acetic acid mixed solvent. C-S point, 262° C.; S-N point, 285.5° C.; and N-I point >300° C.

It was treated with thionyl chloride to give the crude acid chloride, which was directly used in the next step.

The acid chloride (8.4 g), S-(+)-2-butanol (made by Fluka A.G. (3 ml) and dry toluene (100 ml) were heated for 3 hours under reflux, while dry $N_2$ was gently bubbled through to purge hydrogen chloride formed. The cooled reaction mixture was worked up as usual to obtain the ester. This was recrystallized from heptane to obtain S-1-methyl-propyl 4'-benzyloxy-4-biphenylcarboxylate (yield: 8.1 g), m.p. 106°~106.5° C.

This ester was debenzylated by catalytic hydrogenation with Pd/carbon catalyst at normal temperature and pressure, to give S-4'-hydroxy-4-biphenylcarboxylic acid 1-methylpropyl ester, which was used in the next step without purification.

(ii) The captioned compound

3-Fluoro-4-dodecyloxybenzoic acid (G. W. Gray et al, J. Chem. Soc. 1954, 2556) (10 g) was derived to the acid chloride in the usual way.

S-4'-hydroxy-4-biphenylcarboxylic ester (10.0 g, 0.037 mol) obtained in step A was dissolved in 10 ml of pyridine, and treated with the acid chloride (11 g, 0.034 mol) as usual. The resulting material was recrystallized from ethanol; yield 9.9 g.

The phase transition points were as follows: C-$S_c$*, 59.5° C.; $S_c$*-$S_A$, 98.8° C.; $S_A$-I, 131.5° C., as shown in Table 3.

EXAMPLE 6

Preparation of optically active p-dodecyloxybenzoic acid 3-fluoro-4-(5'-methyl-heptyloxycarbonyl)-phenyl ester (a compound of the formula ($I_e$) wherein $X_2$=F, $R_5$=$C_{12}H_{25}$— and

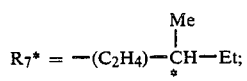

sample No. 66)

A solution of 2-fluoro-4-hydroxybenzoic acid (40.0 g, 0.26 mol), S(—)-5-methyl-heptylalcohol (125.0 g, 0.96 mol), benzene (300 ml) and concentrated sulfuric acid (8 ml) was refluxed for 20 hours with a Dean-Stark reflux condenser, removing the water formed. The reaction mixture was washed with saturated aqueous NaCl solution till the washing liquid became neutral, dried with $Na_2SO_4$, and the solvent and excess S(—)-5-methyl-heptylalcohol were removed by vacuum distillation to afford 3-fluoro-4-(5'-methylheptyloxycarbonyl)-phenol (38.0 g) as residue.

The above phenol (10.0 g, 0.034 mol) in pyridine (10 ml) was treated with 4-dodecyloxybenzoyl chloride (0.031 mol) in the usual way to give the captioned compound. It was purified by recrystallization from ethanol; yield 9.8 g. The phase transition points were as follows: C-$S_c$*, 33.0° C.; $S_c$*-$S_A$, 56.3° C.; $S_A$-I, 59.1° C., as listed in Table 5.

EXAMPLE 7

Preparation of optically active 4'-dodecyl-4-biphenylcarboxylic acid 3-fluoro-4-(6'-methyloctyl)-phenyl ester (a compound of the formula ($I_g$) wherein m=1, $R_8$=$C_{12}H_{25}$— and

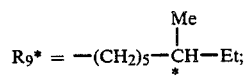

sample No. 94)

S(—)-5-methyl-heptyl bromide (0.70 mol) was treated with 0.74 atom of magnesium in dry ether. To the resulting Grignard reagent was dropwise added a solution of 2-fluoro-4-benzyloxybenzonitrile (0.35 mol) in dry ether (1 l) below 20° C., and the mixture was heated for 10 hours under reflux, and then acidified with dilute sulfuric acid. Ether layer was separated, washed with water and the ether evaporated to dryness to obtain 2-fluoro-4-benzyloxy phenyl 5-methyl-heptyl ketone 896.3 g) as residue.

This ketone (96.0 g) was reduced by Huang Minlon modification of Wolff-Kishner reduction to 2-fluoro-4-benzyloxy-(6'-methyl-octyl)-benzene. This was debenzylated by catalytic reduction with $H_2$/Pd-on-carbon to obtain 3-fluoro-4-(6'-methyl-octyl)-phenol (36.2 g), b.p. 136°~137° (7 mmHg).

This phenol (10 g, 0.042 mol) in pyridine was treated with 4'-dodecyl-4-biphenylcarboxyl chloride as usual, to obtain, after recrystallization from ethanol, the captioned compound (8.4 g); C-S$_c$*, 47.5° C.; S$_c$*-S$_A$, 103.3° C.; S$_A$-I, 120.0° C., as listed in Table 7.

Elemental analysis

|   | Observed values | Calculated values (in terms of $C_{40}H_{55}O_2F$) |
|---|---|---|
| C | 81.60% | 81.86% |
| H | 9.30% | 9.45% |
| F | 3.20% | 3.24% |

EXAMPLE 8

(Use example 1)

A nematic liquid crystal compositionn consisting of
4-ethyl-4'-cyanobiphenyl: 20% by weight,
4-pentyl-4'-cyanobiphenyl: 40% by weight,
4-octyloxy-4'-cyanobiphenyl: 25% by weight and
4-pentyl-4'-cyanoterphenyl: 15% by weight,
was sealed in a cell composed of two opposed substrates each having a transparent electrode coated with polyvinyl alcohol (PVA) as an aligning agent and subjected to rubbing treatment on the surface to effect parallel aligning treatment and having a distance between the electrodes of 10 μm, to prepare a TN type display cell, which was then observed under a polarizing microscope. As a result, a reverse twist domain was observed to be formed.

To the above nematic liqud crystal composition was added a halogen-containing, optically active liquid crystal compound expressed by the following chemical formula of the present invention in a quantity of 1% by weight:

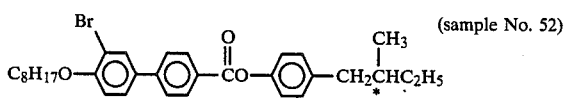
(sample No. 52)

The resulting composition was similarly observed with a TN type cell. As a result, the reverse twist domain was dissolved and a uniform nematic phase was observed.

EXAMPLE 9

(Use example 2)

Using the following five kinds of the halogen-containing, optically active liquid crystal compounds of the formula (I) of the present invention, a liquid crystal compositions was prepared:

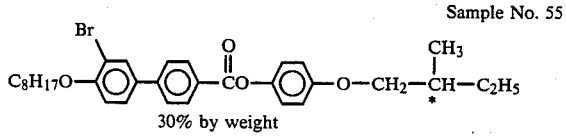
Sample No. 55
30% by weight

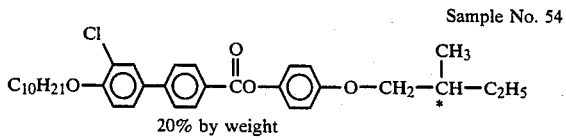
Sample No. 54
20% by weight

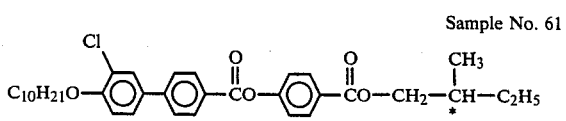
Sample No. 61
20% by weight

-continued
20% by weight

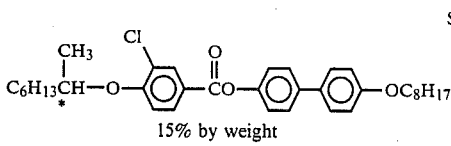
Sample No. 20
15% by weight

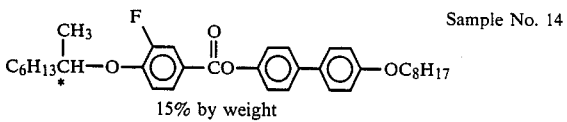
Sample No. 14
15% by weight

The composition was prepared by weighing the above five kinds of liquid crystal compounds each in a definite quantity by weight, and mixing them together in a sample bottle while dissolving them on heating.

Using the composition, a liquid crystal element for experiment was prepared. Namely, a PVA film was provided on a glass substrate provided with a transparent electrode of indium oxide, followed by rubbing the film in a definite direction, and a liquid crystal cell was composed of two opposed sheets of such substrate having glass fibers of 4 μm in diameter placed therebetween so that the rubbing directions of the two substrate sheets might be parallel to each other. The above liquid crystal composition was sealed in this liquid crystal cell in vacuo. The resulting liquid crystal element was provided between two crossed polarizers and an electric field was impressed. Under an impression of 20 V, change in the intensity of transmitted light was observed.

Response time was sought from the intensity of transmitted light at that time to exhibit a value of about 1.2 m sec at 25° C., and the contrast value was 1:20.

Further, with the above liquid crystal composition, the temperature change in the texture thereof was observed under a polarizing microscope. As a result, it was found that the composition constituted a ferroelectric liquid crystal within a temperature range of 15° to 64° C., and the value of its spontaneous polarization was 29 nC/cm² at 25° C.

EXAMPLE 10

(Use example 3)

Using a halogen-containing, optically active liquid crystal compound of the formula (I) of the present invenion and known chiral smectic liquid crystal compounds, the following liquid crystal composition was prepared in the same manner as in Example 9:

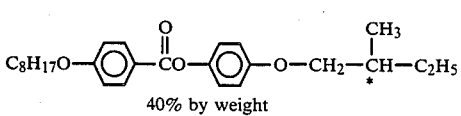
40% by weight

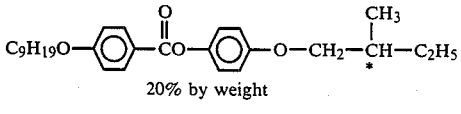
20% by weight

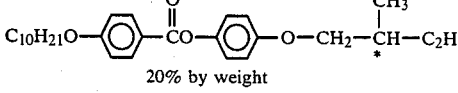
20% by weight

-continued (Sample No. 23)

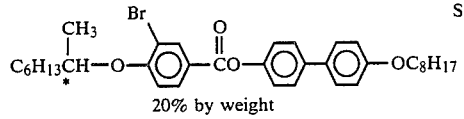

20% by weight

To the composition was added an anthraquinone dyestuff (D-16, a product made by BDH Company) as a dichroic dyestuuff in quantity of 3% by weight to prepare a composition of the so-called guest-host type, which was then poured in the same cell as in Example 9 of 6 μm thick. Using one sheet of a polarizing plate, an electric field was impressed, and under an impression of 20 V, change in the intensity of transmitted light was observed.

Response time was sought from the change in the intensity of transmitted light at that time to exhibit a value of about 2 m sec at 25° C.

Further, with the above liquid crystal composition, the temperature change in the texture thereof was observed under a polarizing microscope. As a result it was found that the composition constituted a ferroelectric liquid crystal within a temperature range of 10° to 50° C., and the value of its spontaneous polarization was 16 nC/cm² at 25° C.

EXAMPLE 11

(Use example 4)

A liquid crystal composition consisting of the following liquid crystal compounds of the formula (I) of the present invention was prepared:

(Sample No. 32)

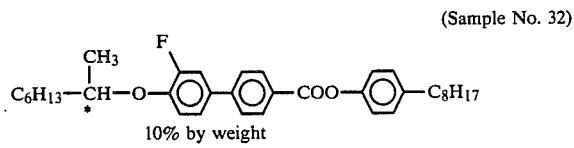

10% by weight (Sample No. 34)

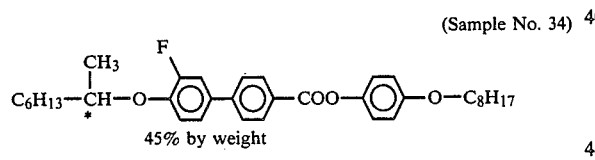

45% by weight (Sample No. 33)

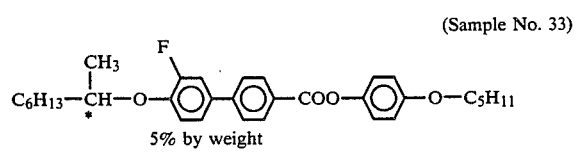

5% by weight (Sample No. 57)

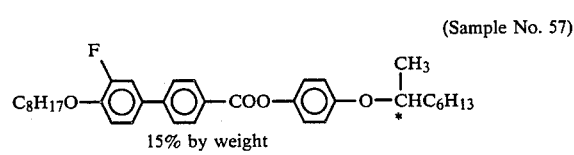

15% by weight (Sample No. 31)

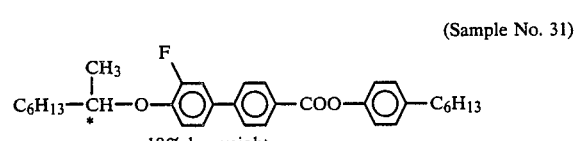

10% by weight (Sample No. 36)

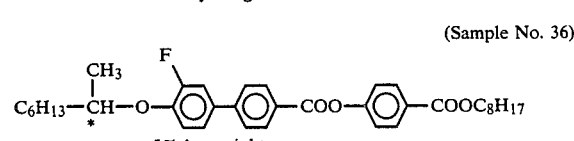

5% by weight

-continued (Sample No. 3)

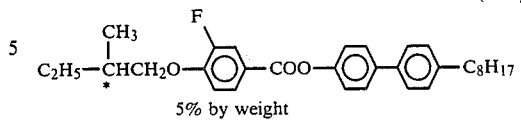

5% by weight (Sample No. 4)

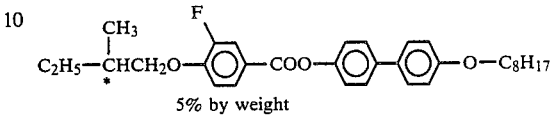

5% by weight

This liquid crystal composition was sealed in a cell of 2 μm thick provided with transparent electrodes coated with polyvinyl alcohol and subjected to parallel alignment by rubbing the surface, and the resulting liquid crystal element was placed between two crossed polarizers and an electric field of 15 V was impressed to observe change in the intensity of transmitted light. Response time was sought from the change in the intensity of transmitted light at that time to give about 180 μsec at 25° C.

The above liquid crystal composition had an upper limit temperature of S$_c$* of 99° C., and no crystallization could be observed. Further, observation was carried out down to −50° C., but smectic phase other than S$_c$* phase did not appear. In addition, the spontaneous polarization value was 150 nC/cm² to 26° C. and the tilt angle was 34°.

EXAMPLE 12

(Use example 5)

A liquid crystal composition consisting of the following liquid crystal compounds of the formula (I) of the present invention:

(Sample No. 71)

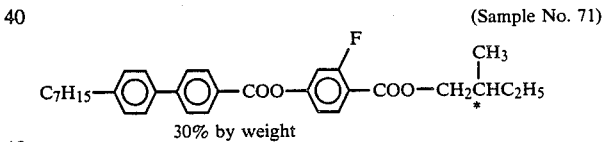

30% by weight (Sample No. 73)

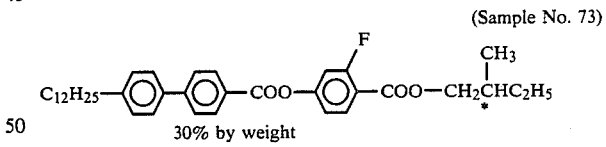

30% by weight (Sample No. 88)

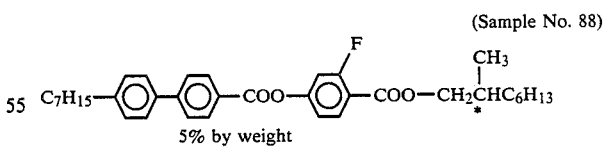

5% by weight (Sample No. 89)

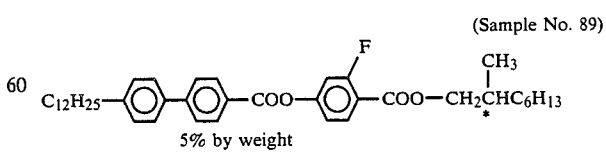

5% by weight (Sample No. 60)

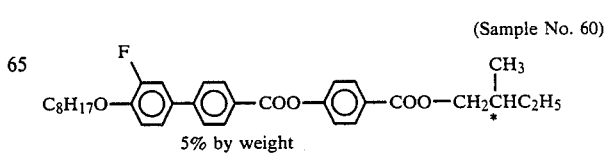

5% by weight

-continued

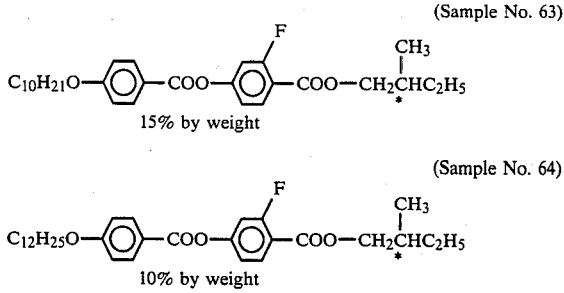

15% by weight (Sample No. 63)

10% by weight (Sample No. 64)

The resulting composition was sealed in the same cell of 2 μm thick as in Example 11, and the resulting liquid crystal element was placed between two crossed polarizers, and an electric field of 15 V was impressed to observe change in the intensity of transmitted light. Response time was sought from the change in the transmitted light at that time to give about 210 μsec at 25° C.

The above liquid crystal composition had an upper limit temperature of $S_c^*$ phase of 55° C. and n crystallization could be observed. Further, observation was carried out down to −50° C., but smectic phase other than $S_c^*$ phase did not appear. In addition, the spontaneous polarization value was 9 $nC/cm^2$ at 25Z° C., and the tilt angle was 22.5° C.

What we claim is:

1. An optically active liquid crystal compound of the formula

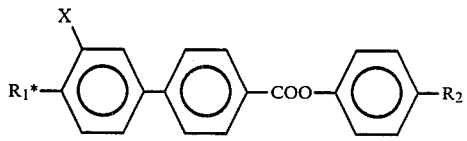

wherein $R_1^*$ is an optically active alkoxy group of 4 to 12 carbon atoms, $R_2$ is an optically inactive alkyl, alkoxy or alkoxycarbonyl group each of which has 4 to 12 carbon atoms, and X is F or Cl.

2. A liquid crystal composition having at least two components at least one of which is an optically active liquid crystal compound as defined in claim 1.

3. A chiral smectic liquid crystal composition having at least two components at least one of which is an optically active liquid crystal compound as defined in claim 1.

* * * * *